Patented Nov. 17, 1931

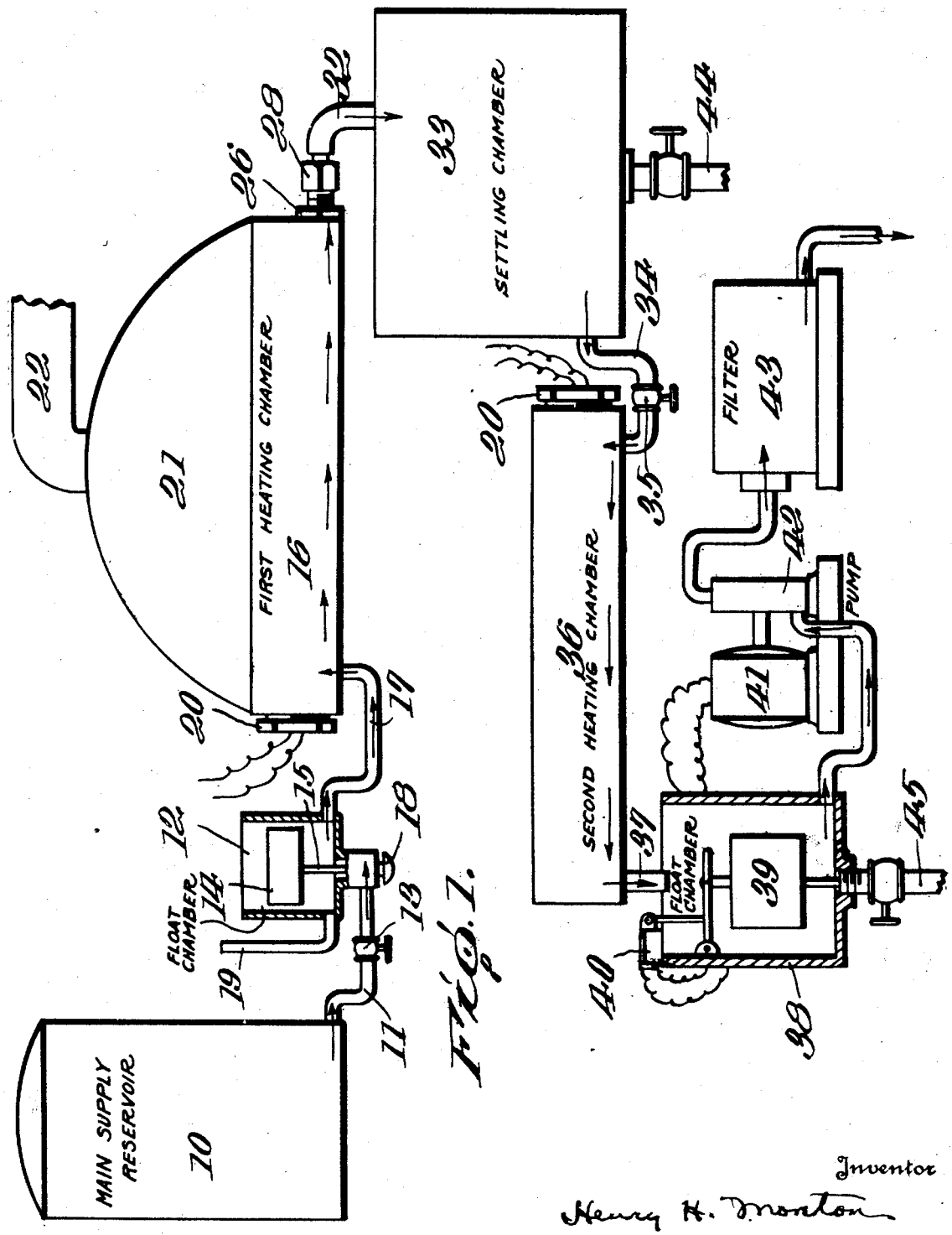

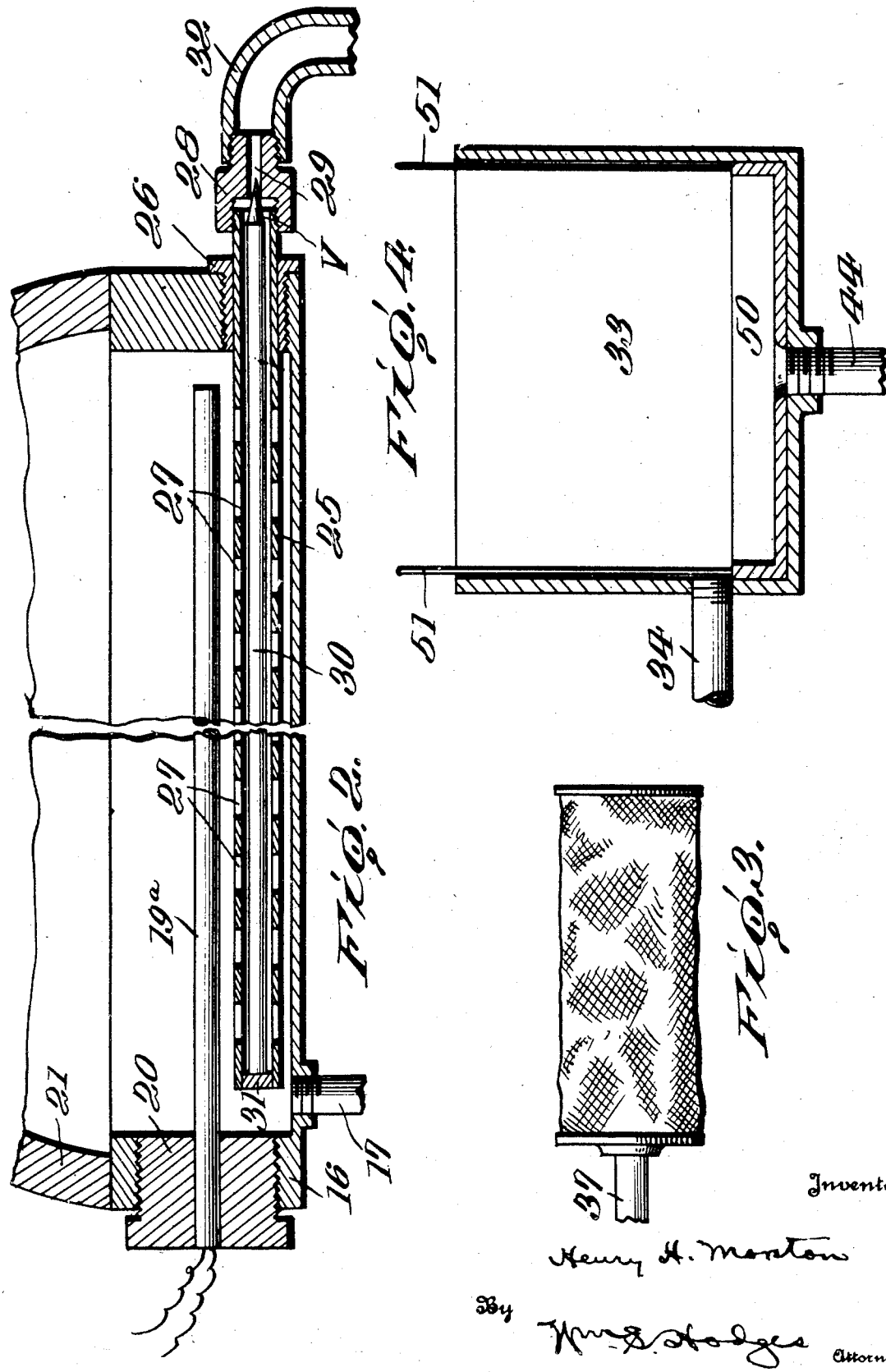

1,831,876

UNITED STATES PATENT OFFICE

HENRY H. MORETON, OF SANTA MONICA, CALIFORNIA, ASSIGNOR OF ONE-THIRD TO O. B. ENGLISCH, OF CHICAGO, ILLINOIS, AND ONE-THIRD TO CHARLES F. CRAIG, OF LOS ANGELES, CALIFORNIA

METHOD OF RECLAIMING CONTAMINATED OILS

Application filed February 2, 1928. Serial No. 251,417.

This invention is a method by which crank case oils, as well as other contaminated oils may be reclaimed and rendered fit for reuse.

One of the objects of the invention is to provide for an effective precipitation of mechanical impurities which are suspended in the oil so that said impurities may be readily eliminated, said precipitation occurring either before or after the removal of the gasoline or similar volatile contents. A further object is to effect the precipitation of the mechanical impurities in a manner that will insure a maximum precipitation of such impurities within a minimum period of time, and without the necessity of employing expensive and cumbersome apparatus.

The invention will be hereinafter fully set forth and particularly pointed out in the claims.

In the accompanying drawings:—

Figure 1 is a diagrammatic view, partly in section, illustrating a form of apparatus for carrying out the invention, it being understood however, that the invention is not limited to this particular apparatus. Figure 2 is a sectional view illustrating the thermostat control apparatus. Figure 3 is a detail view illustrating a form of filter. Figure 4 is a sectional view illustrating a slight modification of the means for removing the sludge.

Referring to the drawings, 10 designates the main or supply tank in which the oil to be treated is initially placed so that it may be supplied to the rest of the illustrated apparatus in carrying out the steps of the method. The tank 10 is provided with an outlet pipe 11, leading to a float chamber 12, a cock 13 being provided to control the outflow of the oil from said tank to the float chamber. Located within said chamber 12 is a float 14, which operates a valve 15, controlling the flow of oil from the float chamber to a heating chamber 16, through a pipe 17. Said float chamber is provided with a sediment outlet 18, and also with a gage glass 19.

The heating chamber consists of a trough-like casing in which the oil may be heated in any desired manner, but it is preferred to employ one or more electrical heating elements, conventionally illustrated at 19a, supported by the head 20, and extending longitudinally of the casing at a level to be submerged in the oil. Current may be supplied to the heater from a suitable source of electricity, in any desired or well known manner. The trough is open at its top, but in order to carry off such gasoline or similar volatile constituents as may be driven off by the heat, a hood 21 is supported over the trough so as to direct said constituents to a flue 22 leading to a suitable condenser, not shown. The heater element 19a may be constructed to raise the temperature of the oil to any desired degree, preferably not exceeding 300 degrees Fahrenheit. It has been found in practice that if the oil is heated to a temperature of approximately 260 degrees Fahrenheit, and maintained at that temperature for a short time, the gasoline and other similar volatile content will be fully driven off, because the combination of gasoline and the like with the oil appears to be merely a mechanical mixture which is readily broken up at the named temperature.

In order that the flow of the oil through the heating chamber may be controlled so as to subject it to the desired heating temperature for a period long enough to insure separation of the gasoline and the like, a thermostatic valve V is provided. Said valve consists of a tube 25 of brass or similar metal, mounted in a bushing 26, screwed into an end wall of the chamber 16, so as to submerge the tube within the oil contained within the chamber. Said tube is provided with perforations 27 to permit oil to flow into the tube, and the outer end of the tube is closed by a cap 28, provided with an outlet opening 29. The flow of oil through said opening is controlled by means of a rod 30 of steel or other desired metal having a different coefficient of expansion from that of the tube 25, said rod being supported at its inner end by the inner end of the tube, as indicated at 31. It is to be understood that while the oil is cold or below the temperature for which the thermostat is set, the opening 29 is closed by the rod 30 in a manner to prevent the outflow of oil from said heating chamber. As soon as the temperature of the oil rises to the desired degree, however, the rod is withdrawn from the opening 29 and the oil is free to flow therethrough.

The cap 28 has a threaded engagement with the end of tube 25, so that it may be adjusted with respect to the rod, to vary the range of movement of the rod 30 with respect thereto.

From the heating chamber 16 the oil is conducted by means of a pipe 32, connected with opening 29, to a settling chamber 33 into which it is discharged. While the oil is contained within said chamber a powdered calcareous cement is mixed with the oil and the contents of the tank allowed to settle. It is preferred to use finely powdered gypsum for this purpose because this material is more easily handled and appears to have a very strong affinity for carbon particles and other mechanical impurities suspended in the oil, but other calcareous cements such as Portland cement and natural cement, for instance, possess to some degree this same peculiar attraction for the carbon particles. In practice, it has been found that if the oil is subjected to a treatment of from five percent to ten percent finely divided gypsum deposited therein, the gypsum will sink to the bottom of the container and carry with it the suspended mechanical impurities, within twenty four hours when cold, and much quicker if the oil is heated. The process of separation may be greatly facilitated by first treating the oil with about two percent of concentrated sulphuric acid, and allowing it to settle until a residuum is formed and settles out, and then introducing the gypsum. The use of a small amount of acid causes the gypsum to settle in about one fourth the time that is required when no acid is used. If desired to remove all possible trace of the sulphuric acid, the oil may be washed with water or treated with a small amount of sulphate of soda.

After the impurities have been settled out by use of the "gypsum" treatment, the oil may be drawn from the tank 33 and subjected to a mechanical filtering process, after which it is ready for any use for which it was originally capable of being employed.

The filtering operation is greatly facilitated by raising the temperature of the oil, and for this purpose, the tank 33 is provided with an outlet pipe 34, controlled by a cock 35, and discharging into a second heating chamber 36, containing a heater element similar to the element 19a of chamber 16. The heating chamber 36 is provided with an outlet pipe 37, discharging into a float chamber 38, in which is located a float 39, controlling a cut-out switch 40. Said switch in turn controls the circuit to an electric motor 41, which operates a pump 42, having its supply pipe connected with the float chamber and its discharge pipe connected with a filter press conventionally illustrated at 43. It is to be understood that the filter press is referred to merely for illustrative purposes, and that any other method of filtering that may be found desirable, may be employed. The tank 33 and the float chamber 38 are provided with sludge outlets 44 and 45, respectively.

In operation, the oil to be treated is introduced into the tank 10 and is allowed to flow therefrom into the heating chamber 16, the speed of flow being controlled by the float valve 15. When the oil in the heating chamber 16 has reached the desired level the circuit to the heater element 19a is closed, the flow of oil to said heating chamber being arrested by the float valve until the thermostatic valve 30 is operated to permit discharge of oil through the opening 29. During the heating period the volatile diluents pass upwardly into the flue 22. The oil flows from the heating chamber 16 into the settling chamber 33, and when said chamber has been filled with oil to the desired extent it is subjected to the "gypsum" treatment above described. By "gypsum treatment" it is to be understood is meant the employment of a calcareous cement such as gypsum, Portland cement, natural cement, or similar cements having an affinity for the suspended particles, either with or without the use of sulphuric acid. If desired to use sulphuric acid, it may be introduced into the oil in tank 10 or chamber 33, as desired. After the "gypsum" treatment the cock 35 is opened and the oil is permitted to flow into the second heating chamber 36, and from thence into the float chamber 38. As soon as said float chamber is filled to the desired extent the float will have risen sufficiently to close the circuit to the motor 41, by means of the switch 40, and thereupon the oil will be forced by the pump 42 through the filter press in a well understood manner. It is to be understood, of course, that in lieu of employing the filter press, a filter bag may be connected to pipe 37, as illustrated in Figure 3. If desired the removal of the volatile constituents may be postponed until after the "gypsum" treatment, or even after the filtering operation, but it is preferred to perform this step at the outset.

After the settling operation, the sludge may be removed from the tank 33 through the outlet 44, or if desired said tank may be provided with a sludge basket 50, as illustrated in Figure 4. Said basket rests upon the bottom of the tank and is provided with handles 51 by means of which it may be manipulated.

The advantages of the invention will be readily understood by those skilled in the art to which it belongs. For instance, an important advantage is that contaminated oils, such as used crank case oil for instance, may be so purified in a very short space of time, that it is capable of reuse in any capacity for which it was originally intended.

A very important advantage is that the process above described is an exceedingly simple one, capable of being economically carried out, because it avoids the use of highly expensive cumbersome apparatus.

No claim for the apparatus is made herein because said apparatus is made the subject of a separate concurrently filed application, Serial No. 251,416.

Having thus explained the nature of the invention and described an operative manner of practicing the same, although without attempting to set forth all of the forms of its use, what is claimed is:—

1. A method of reclaiming contaminated oils comprising introducing into the oil a relatively small quantity of sulphuric acid, then precipitating the impurities mechanically suspended in the acidulated oil by introducing gypsum thereinto, allowing the mixture to stand until the impurities settle, and finally draining off the oil.

2. A method of reclaiming contaminated oils comprising first raising the temperature of the oil to drive off the volatile diluents, then introducing into the oil a relatively small quantity of sulphuric acid, then precipitating the impurities mechanically suspended in the acidulated oil by introducing gypsum thereinto, allowing the mixture to stand until the impurities settle, and finally draining off the oil.

3. A method of reclaiming contaminated oils comprising first removing gasoline and other similar volatile constituents from the oil, next introducing into the oil a relatively small quantity of sulphuric acid, then precipitating the impurities mechanically suspended in the acidulated oil by introducing gypsum thereinto, allowing the mixture to stand until the impurities settle, and finally draining off the oil.

4. A method of reclaiming contaminated oils comprising first raising the temperature of the oil to drive off the volatile diluents, then introducing into the oil a relatively small quantity of sulphuric acid, then precipitating the impurities mechanically suspended in the acidulated oil by introducing gypsum thereinto, allowing the mixture to stand until the impurities settle, and finally filtering the oil from which said impurities have been precipitated.

5. A method of reclaiming contaminated oils comprising raising the temperature of the oil to drive off the volatile diluents, then introducing into the oil a calcareous cement having an affinity for the impurities mechanically suspended therein, allowing said cement to settle to the bottom of the oil so that it will carry with it the attracted impurities, and finally draining off the oil.

6. A method of reclaiming contaminated oils comprising first treating the oil to remove gasoline and other similar volatile diluents, then introducing into the oil a calcareous cement having an affinity for the impurities mechanically suspended therein, allowing said cement to settle to the bottom of the oil so that it will carry with it the attracted impurities, and then draining off the oil.

7. A method of reclaiming contaminated oils comprising introducing into the oil a calcareous cement having an affinity for the impurities mechanically suspended therein, allowing said cement to settle to the bottom of the oil so that it will carry with it the attracted impurities, and finally filtering the oil from which said impurities have been precipitated.

8. A method of reclaiming contaminated oils comprising first treating the oil to remove gasoline and other similar volatile diluents, then introducing into the oil a calcareous cement having an affinity for the impurities mechanically suspended therein, allowing said cement to settle to the bottom of the oil so that it will attract and carry said impurities with it, and finally again heating the oil and filtering it.

In testimony whereof I have hereunto set my hand.

HENRY H. MORETON.